April 16, 1935.  H. M. ADAMS  1,997,845
METER COUPLING
Filed April 25, 1934   2 Sheets-Sheet 1
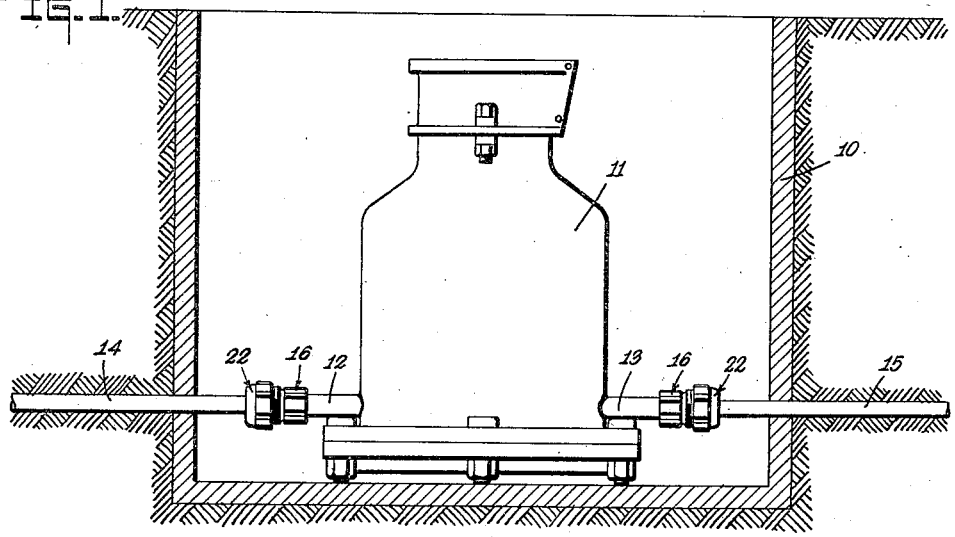
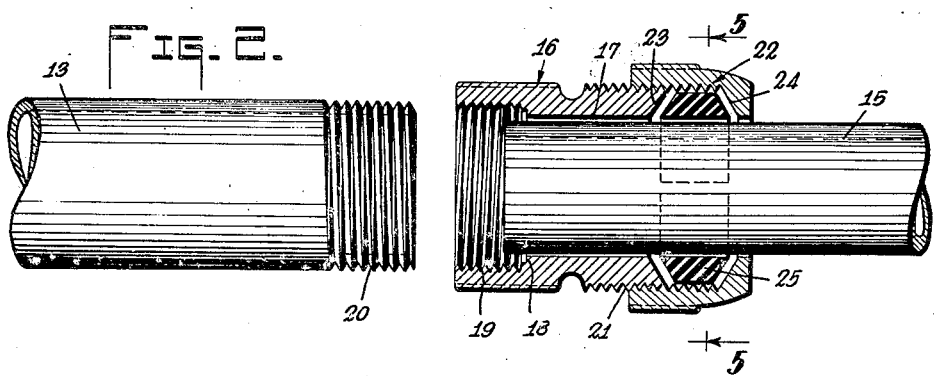
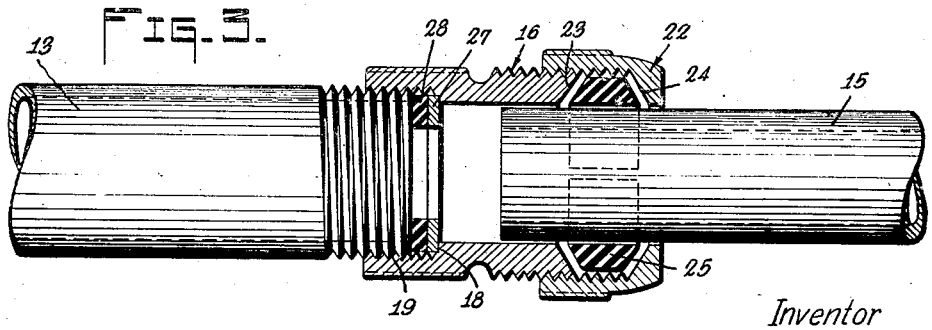
Inventor
H. M. Adams
by Hazard and Miller
Attorneys.

April 16, 1935. H. M. ADAMS 1,997,845
METER COUPLING
Filed April 25, 1934 2 Sheets-Sheet 2
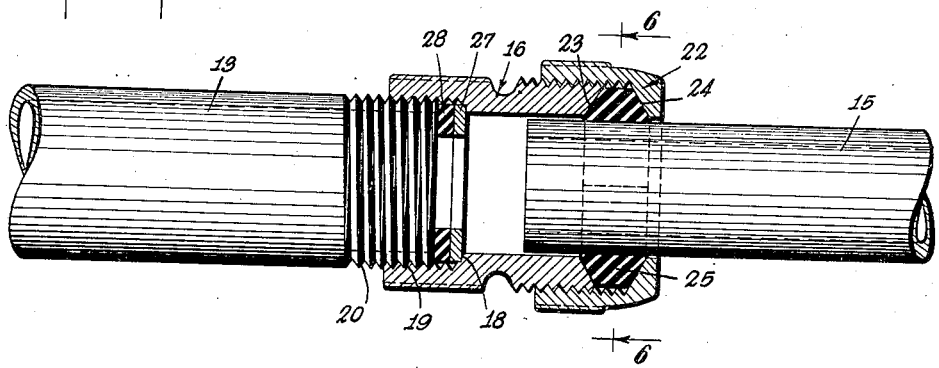
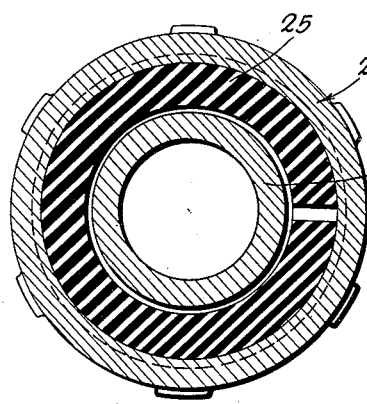 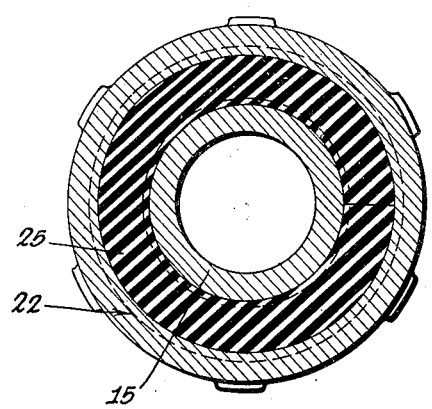
Inventor
H. M. Adams.
by Hazard and Miller
Attorneys Patented Apr. 16, 1935

1,997,845

UNITED STATES PATENT OFFICE 1,997,845

METER COUPLING

Henry M. Adams, Los Angeles, Calif., assignor to Adams Brothers Incorporated, Ltd., Los Angeles, Calif., a corporation of California Application April 25, 1934, Serial No. 722,314

2 Claims. (Cl. 285—3)

This invention relates to improvements in meter couplings used for connecting meters such as water meters to supply pipes.

Water meters are customarily disposed within meter boxes which are embedded in the ground and the ends of a supply pipe in which the meter is inserted extend into the meter box. These meters from time to time must be removed and replaced. Heretofore, the customary practice has been to accurately cut the supply pipe so that its ends are spaced a distance across the water meter. A gasket or washer is then interposed between each end of the water meter and each end of the supply pipe and a threaded coupling tightens the ends of the supply pipe against the ends of the water meter. This tightening action imposes a tension on the supply pipe and in the course of time the supply pipe stretches or adopts a "set". Consequently, when it is necessary to remove the meter for purpose of replacement the stretch or "set" of the supply pipe hinders the insertion of a new meter.

Such types of construction are disadvantageous in that it is difficult to accurately cut the supply pipe in the limited space afforded by the meter box and consequently it is difficult to form a leak-proof joint between the supply pipe and the meter when the meter is originally installed. Thereafter, whenever replacement is required difficulties are encountered due to the supply pipe having been stretched or having adopted a "set".

It is an object of the present invention to provide an improved meter coupling which is advantageous in that it is not necessary to accurately cut a supply pipe to closely fit the meter but instead, any suitable clearance between the supply pipe and the meter may be left. The improved construction is further advantageous in that it does not impose a tension on the supply pipe when tightened. Furthermore, a leak-proof joint is established and at the same time the coupling may be disconnected very easily to permit the removal and replacement of meters.

With the foregoing and other objects in view which will be made manifest in the following detailed description and specifically pointed out in the appended claims, reference is had to the accompanying drawings for an illustrative embodiment of the invention wherein:

Fig. 1 is a vertical section through a water meter box illustrating a water meter therein connected to the ends of a supply pipe and employing the improved meter couplings as a means for establishing the connection.

Fig. 2 is a partial view illustrating an end of the meter and the adjacent end of a water supply pipe illustrating the manner in which the improved meter coupling is applied to the supply pipe before establishing the connection.

Fig. 3 is a view similar to Fig. 2 illustrating the first step taken in making the connection between the meter and the supply pipe.

Fig. 4 is a view similar to Fig. 2 illustrating the connection as having been completed.

Fig. 5 is a vertical section taken upon the line 5—5 upon Fig. 2.

Fig. 6 is a vertical section taken upon the line 6—6 upon Fig. 4.

Referring to the accompanying drawings wherein similar reference characters designate similar parts throughout, the water meter box is indicated at 10 and may be of any conventional construction, the preferred method of installation being to embed the box in the ground. Within the water meter box 10 there is disposed the meter 11 having opposed nipples 12 and 13, nipple 12 being adapted to be connected to section 14 of a water supply pipe while nipple 13 is adapted to be connected to section 15. In the conventional practice the internal diameter each of nipples 12 and 13 is one inch, whereas the internal diameter of supply pipe sections 14 and 15 is three-quarters of an inch. While the application of the invention is in no way restricted to these particular sizes they are referred to because they conform to conventional practice and the construction of the meter coupling is somewhat affected with relation to these sizes.

The meter coupling comprises a body 16 having a bore 17 therethrough which is slightly larger than the outside diameter of the supply pipe. This bore extends completely through the body so that it is possible to slip the body entirely onto the supply pipe. One end of the body is internally enlarged forming a small shoulder 18 which is exposed toward the meter and this end is internally threaded as at 19 providing for a threaded engagement with the threads 20 on the water meter nipple. The opposite end of the body is externally threaded as at 21 for the attachment of a bonnet 22. This opposite end of the body is coned or bevelled out as indicated at 23 and the interior of the bonnet is preferably bevelled in a similar manner as indicated at 24. A compressible packing ring 25 is disposed between the end of the body and the bonnet. This packing ring may or may not be split. It is preferably formed of relatively stiff but flexible rubber. A ring 27 is provided which is designed to be positioned against shoulder 18. This ring has an internal diameter somewhat smaller than that of bore 17 so that when it is installed it projects inwardly in the bore 17. This ring forms a seat for a gasket or washer 28. The method of installation and the advantages of the improved meter coupling are as follows:

On initially installing a meter the supply pipe is cut so that the adjacent ends of sections 14 and 15 will be spaced sufficiently to accommodate the meter 11. It is not necessary to accurately cut the supply pipe to enable the meter to closely fit therein as in prior practice, in fact, a substantial clearance of as much as half an inch on each side of the meter may be left. A meter coupling is then slid onto each of sections 14 and 15, the bonnet 22 being outermost and being loose on the body so that ring 25 is not compressed. Each meter coupling is slid onto its respective supply pipe section a sufficient distance to permit the insertion of the meter 11 in the supply pipe. By virtue of the fact that there are no shoulders in bore 17 which are exposed toward the supply pipe section, the meter coupling can be slid entirely onto the supply pipe if necessary during the insertion of the meter. Thereafter the meter coupling is caused to slide back toward the meter so that the end of the supply pipe is disposed outwardly of shoulder 18. Metal ring 27 is then positioned on shoulder 18 and the rubber gasket or washer 28 is positioned thereagainst. As ring 27 extends inwardly in the bore 17, its effect is to broaden the shoulder on which gasket 28 is seated. In other words, shoulder 18 would be too small to originally seat gasket or washer 28. When ring 27 and gasket 28 are in position the body 16 is turned by a suitable wrench and screwed onto the nipple of the meter. Thereafter bonnet 22 is rotated by a wrench and is backed onto the body, compressing ring 25 and squeezing it tightly around the exterior surface of the supply pipe. It adopts a position on the supply pipe occasioned by the position of the meter forming a packed joint as shown in Fig. 4. The improved meter coupling not only permits the supply pipe to be cut with considerable clearance with respect to the ends of the meter but when tightened it imposes no tension on the supply pipe. Consequently there is no stretching of the supply pipe nor any tendency for the supply pipe to adopt a "set" which would interfere with the removal and replacement of meters. Furthermore, if the supply pipe sections 14 and 15 should not be perfectly in line, the slight clearance between bore 17 and the exterior of the supply pipe permits of a slight adjustment enabling the meter coupling to accommodate itself to the slightly disaligned supply pipe sections.

When it is necessary to remove and replace a meter, bonnet 22 is first unscrewed, loosening the packing ring 25. However, in the course of time, it frequently occurs that the rubber packing ring freezes or partially vulcanizes itself to the exterior of a supply pipe. On unscrewing body 16 from the nipple of the meter this body functions somewhat as a jack screw enabling a large mechanical advantage to be developed to force packing ring 25 to slide outwardly on the supply pipe thus breaking the adhesive bond that may form between the packing ring and the supply pipe. The meter coupling is thus caused to slide entirely onto the supply pipe, ring 27 and washer 28 are recovered, and the meter bodily taken out. On the insertion of a new meter the coupling is then connected thereto in the same way as that previously described in connection with the initial installation.

From the above described construction it will be appreciated that an improved meter coupling is provided which is highly advantageous in that it enables the supply pipe to be cut with plenty of clearance on both sides of the meter. A fluid-tight joint is established on tightening the coupling without imposing a tension on the supply pipe. The coupling adjusts itself or accommodates itself to various conditions and at all times enables the removal and replacement of meters without difficulty.

Various changes may be made in the details of construction without departing from the spirit or scope of the invention as defined by the appended claims:

I claim:

1. A meter coupling comprising a body internally threaded on one end for attachment to a meter and a bonnet on the other end of the body, a compressible member between the bonnet and the end of the body adapted to receive a supply pipe, there being provision made for tightening the bonnet to compress the compressible member and tighten it about the supply pipe, the body having a bore therethrough of such size as to enable it to be slipped entirely onto the supply pipe, there being a shoulder in the body exposed toward the meter, a ring adapted to be positioned on the shoulder and project inwardly into the bore and a gasket receivable against said ring.

2. A meter coupling comprising a body internally threaded at one end for attachment to a meter, a bonnet threaded onto the other end of the body, a compressible packing member between the end of the body and the bonnet adapted to be compressed to form a packed joint about a supply pipe, said body having a bore enabling a supply pipe to be passed entirely therethrough, there being a shoulder in the body exposed toward the meter, a ring on the shoulder and a gasket against the ring.

HENRY M. ADAMS.